United States Patent
Nagaraj et al.

(10) Patent No.: US 9,667,777 B1
(45) Date of Patent: May 30, 2017

(54) AUTOMATED BULK PROVISIONING OF PRIMARY RATE INTERFACE AND SIP TRUNK TELEPHONE NUMBERS

(71) Applicant: Time Warner Cable Enterprises LLC, New York, NY (US)

(72) Inventors: Prasanna Nagaraj, Ashburn, VA (US); Naresh Kumar, Stone Ridge, VA (US); Srinivas Guduru, Ashburn, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 120 days.

(21) Appl. No.: 13/681,753

(22) Filed: Nov. 20, 2012

(51) Int. Cl.
 H04M 1/24 (2006.01)
 H04M 3/08 (2006.01)
 H04M 3/22 (2006.01)
 H04M 3/42 (2006.01)
 H04M 3/30 (2006.01)

(52) U.S. Cl.
 CPC ......... H04M 3/42136 (2013.01); H04M 3/22 (2013.01); H04M 3/30 (2013.01); H04M 3/42153 (2013.01)

(58) Field of Classification Search
 CPC ....... H04M 3/42153; H04M 3/22; H04M 3/30
 USPC ............... 379/27.01, 201.02, 201.12, 207.02
 See application file for complete search history.

(56) References Cited

U.S. PATENT DOCUMENTS

| | | | |
|---|---|---|---|
| 6,546,095 B1* | 4/2003 | Iverson et al. | 379/201.12 |
| 6,889,339 B1* | 5/2005 | D'Amico | H04L 12/2697 |
| | | | 379/15.01 |
| 2004/0082323 A1* | 4/2004 | Smith | 455/418 |
| 2011/0103566 A1* | 5/2011 | Sarkar et al. | 379/201.12 |

* cited by examiner

*Primary Examiner* — Nafiz Hoque
(74) *Attorney, Agent, or Firm* — Chapin Intellectual Property Law, LLC

(57) ABSTRACT

A broadband provisioning system configured for bulk provisioning of communications services is provided. The system includes an order manager that includes machine executable instructions stored on machine readable media, the instructions for: receiving a request to provision a plurality of telephone numbers with communications services; creating details for the request and setting an initial state for the request; and upon commencement of processing of the request, updating the state of the request to indicate ongoing processing, provisioning each telephone number in the request by associating resources therewith, and updating a status for each telephone number provisioned; and upon completion of processing, changing the state of the request to indicate completion.

14 Claims, 7 Drawing Sheets

AUTOMATED BULK PROVISIONING OF PRIMARY RATE INTERFACE AND SIP TRUNK TELEPHONE NUMBERS

BACKGROUND

The ever increasing need for telecommunication services has given rise to a variety of technologies. In each case, satisfying user demands has called for "provisioning" of the various systems that will be used to provide services. That is, for example, provisioning a communications infrastructure for a user may require switching certain connections, establishing billing records, establishing privileges and the like. Historically, provisioning systems has not been very problematic. That is, where only a few customers (i.e., telephone numbers) were initiated, it has not been very burdensome.

However, where demand for rapid deployment as well as increased service loads are increasingly in play, satisfying the demand has brought complication. For example, Primary Rate Interface (PRI) and Signaling Initiation Protocol (SIP) Trunk Service may be used to support up to 10,000 or more telephone numbers under one account. As one might imagine, provisioning the great variety of services now available to customers, in such large quantity, can consume considerable system resources which impede system operation.

Makeshift approaches have been devised to address this problem. For example, customer orders are often input to a spreadsheet, which is then provided as an input file for provisioning scripts. The scripts are then used for provisioning multiple downstream systems such as soft switches, directory servers and customer premise equipment. Provisioning such a large number of telephone numbers using manual processes or using traditional billing and order management systems presents unique challenges in terms of order co-ordination, errors inherent with manual intervention, time spent provisioning single telephone number at a time and waiting for response, handle provisioning rollbacks in case of errors and the like.

Thus, what are needed are methods and apparatus for simplifying provisioning in a high capacity telecommunications infrastructure, such as a Primary Rate Interface (PRI) and Signaling Initiation Protocol (SIP) Trunk Service. Preferably, the techniques minimize impact on resources used for system operation.

SUMMARY

In one embodiment, a broadband provisioning system configured for bulk provisioning of communications services is provided. The system includes an order manager that includes machine executable instructions stored on machine readable media, the instructions for: receiving a request to provision a plurality of telephone numbers with communications services; creating details for the request and setting an initial state for the request; and upon commencement of processing of the request, updating the state of the request to indicate ongoing processing, provisioning each telephone number in the request by associating resources therewith, and updating a status for each telephone number provisioned; and upon completion of processing, changing the state of the request to indicate completion.

In another embodiment, a computer program product including machine executable instructions stored on machine readable media is provided. In this embodiment, the product includes instructions for operating a broadband provisioning system configured for bulk provisioning of communications services, the system including instructions for: receiving a request from a billing system for provisioning a plurality of telephone numbers with at least one communications service; for each communications service, selecting an adapter configured to provision the respective communications service; provisioning each telephone number in the request by using the respective adapter; and, identifying each failed instance of provisioning.

In yet another embodiment, a broadband provisioning system configured for bulk provisioning of communications services is provided. The system includes an order manager that includes machine executable instructions stored on machine readable media, the instructions for: receiving a request to provision a plurality of telephone numbers with communications services; creating details for the request and setting an initial state for the request; and upon commencement of processing of the request, updating the state of the request to indicate ongoing processing, provisioning each telephone number in the request by selecting a respective adapter for each resource and associating resources therewith, and updating a status for each telephone number provisioned; and upon completion of processing, changing the state of the request to indicate completion.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Disclosed herein are techniques for provisioning telephone numbers in a Primary Rate Interface (PRI) and Signaling Initiation Protocol (SIP) Trunk Service. The techniques provide for substantially automated fulfillment with minimal impact upon system operation.

In order to provide some context for the teachings herein, aspects of communications system that includes a Primary Rate Interface (PRI) and a Signaling Initiation Protocol (SIP) Trunk Service are now introduced.

Figure 1:
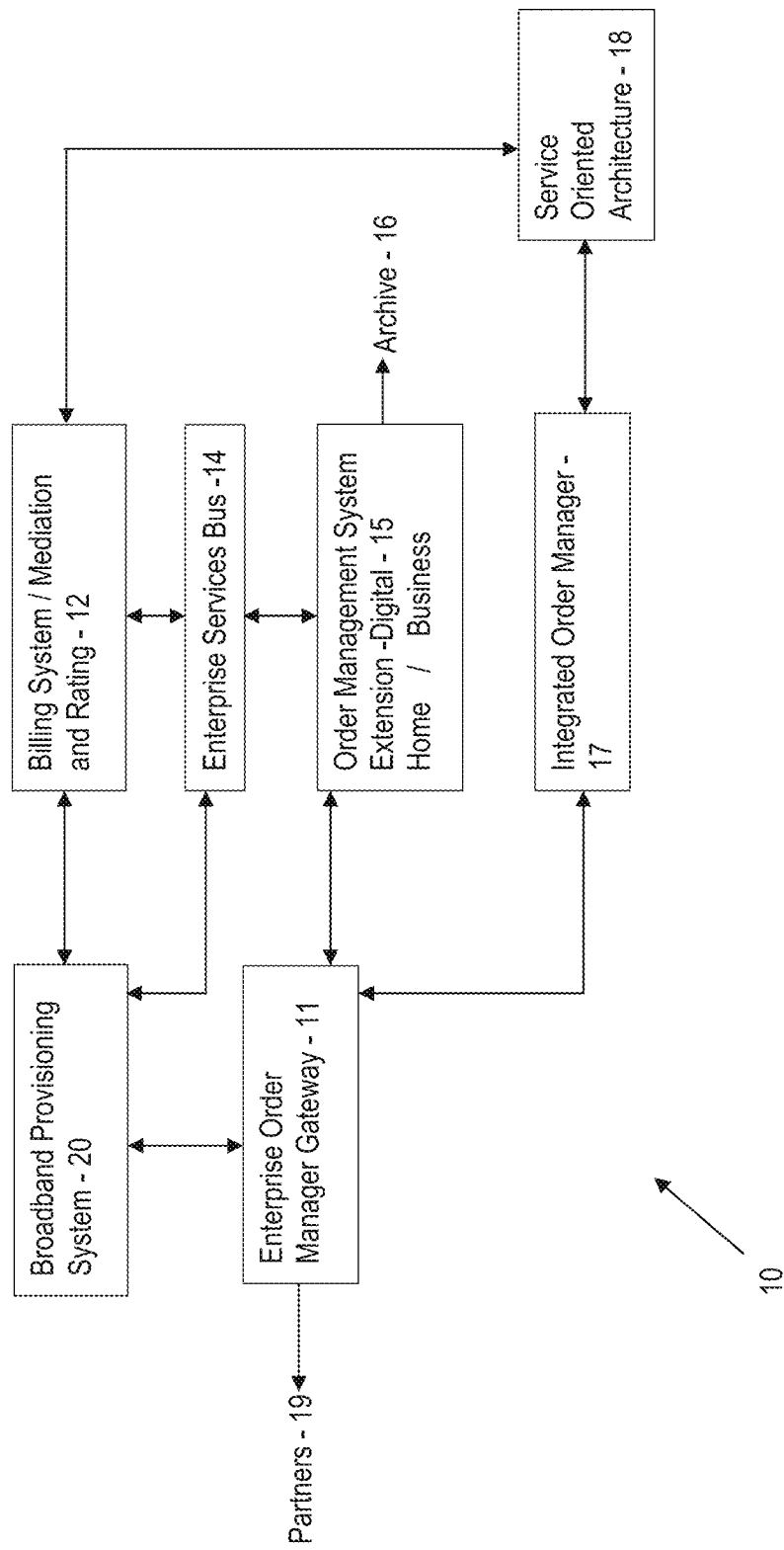
FIG. 1 is a diagram of exemplary components of an order manager architecture for a communications system.

Referring now to FIG. 1, there is shown an exemplary architecture for a Service Fulfillment Order Manager 10 (also referred to simply as an "Order Manager 10" (referred to as "OM")). Generally, the Order Manager 10 includes substantial computing resources. For example, the Order Manager 10 may include one or more servers, databases, switches, bridges, nodes, links, interfaces and other such resources as may be found in a centralized and/or decentralized enterprise computing infrastructure or system. Software (that is, machine executable instructions stored on machine readable media), may be included as a part of the Order Manager 10 at a variety of levels, and provide for a variety of functions. In one example, software provides for order fulfillment. For example, when provisioning a user, an operator may access the Order Manager 10 using one of a variety of interfaces (e.g., a personal computer). In this example, the operator will access software of the Order Manager 10 that is stored on one of the servers. The software, in turn, will then proceed with establishing records in databases, turning on communication links and the like.

Generally, the Order Manager 10 provides system operators with substantial resources for configuration management and provisioning of a complex communications network. The resources are substantially separate from a production system (i.e., a communications network), and therefore operation of the Order Manager 10 generally limits impact upon system production. As one example, the Order Manager 10 provides system operators with capabilities to manage services such as high speed data and digital telephone services. Included in management responsibilities are provisioning of new services, coordination of resources (including third party providers), billing, reporting and the like.

In the exemplary embodiment of FIG. 1, the Order Manager 10 includes a Broadband Provisioning System 20 (referred to as "BPS"); an Enterprise Order Manager Gateway 11 (referred to as "EOMG"); at least one partner 19; a Billing System 12 (which may optionally include Mediation and Rating capabilities, collectively referred to as "BSMR"); an Enterprise Services Bus 14 (referred to as "ESB"); an Order Management System Extension 15 (referred to as "OMSE"); an Archive 16; an Integrated Order Manager 17 (referred to as "IOM"); and other capabilities as may be implemented in a Service Oriented Architecture 18 (referred to as "SOA"). Note that each of the foregoing components may further include a plurality of subcomponents. Subcomponents in one of the components shown in FIG. 1 may be duplicative of subcomponents in another one of the components. For example, the Broadband Provisioning System 20 may include at least one user interface, while the Billing System 12 and the Integrated Order Manager 17 also include at least one user interface. As one might surmise, embodiments of the Order Manager 10 may become quite complex.

Figure 2:
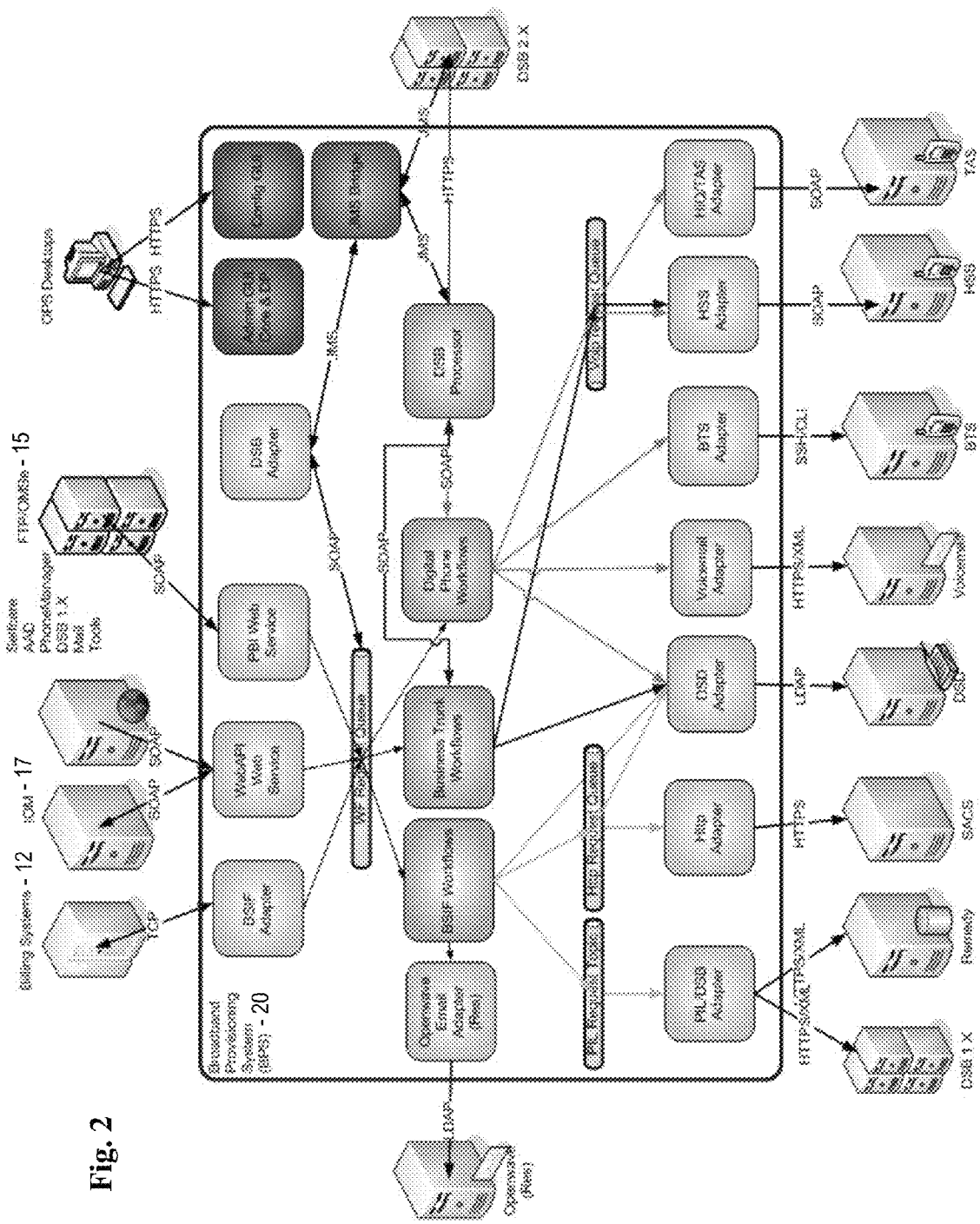
FIG. 2 is a diagram of an exemplary broadband provisioning system for the order manager of FIG. 1.

Turning now to FIG. 2, there is shown an exemplary Broadband Provisioning System (BPS) 20. The BPS 20 includes a variety of subcomponents and interfaces with a variety of other components. In this example, architecture of the BPS 20 includes a two-tier architecture: an application tier and a database tier. The application tier includes a plurality of weblogic application servers. The database tier includes a plurality of database Servers. In this example, the application tier is responsible for processing all transactions and it will deploy BPS specific adapters and workflows.

Generally, BPS application software includes many components. FIG. 2 provides one exemplary embodiment of relationships between these components, such that processing of incoming requests from upstream systems are completed. In some embodiments, the BPS components are deployed in weblogic application servers.

The BPS components will process High Speed Data (HSD) and Digital Phone service management requests from Billing Systems 12, OMSE 15/IOM 17 and other systems. A variety of calling features may be deployed as communications services. Non-limiting examples include, international calling, caller ID, call waiting, and call forwarding, video conferencing, on-screen features (such as caller ID), and the like.

The HSD service may activate a cable modem for a customer, and enable access to create HoH (Head of Household) and sub email users. In order to initiate these processes, the High Speed Data Service request is initiated by the Billing System 12. In the BPS 20, a Billing Specification Interface (BSIF) adapter receives the transaction request and uses BSIF workflows and other components to fulfill the request.

The Digital Phone Service activates customer voice services that may include IP Digital Phone and Voice Mail Services. The Digital Phone Service also enables Commercial Customer services. These services may include PRI and SIP Trunk Services, Remote Call Forward, Hunt Group, Business Group and Auto Attendant. The Digital Phone Service order is initiated by the Billing System 12 and routed to BPS 20 thru OMSE 15. In the BPS 20, a Provisioning Billing Interface (PBI) Web Service receives a transaction request and uses PBI workflows and other components to fulfill the request.

The BPS application may use various ones of the subcomponents shown in FIG. 2 to fulfill transaction requests. Exemplary and non-limiting aspects of the various subcomponents of the BPS 20 are now introduced.

BSIF Adapter. Generally, the BSIF Adapter provides an interface for Billing Systems to submit HSD transaction requests. The adapter transforms the transaction and sends the transaction request to BSIF workflows through a Java Messaging Service (JMS) queue. In some embodiments, the BSIF Adapter makes use of Java Resource Adapter technology.

BSIF workflows. The BSIF workflows orchestrate the business logic for provisioning the HSD service. The BSIF workflows may make use of many adapters to provide for provisioning of services. In some embodiments, the BSIF workflows make use of weblogic JPD (Java Process Definition).

Openwave Email Lightweight Directory Access Protocol (LDAP) Adapter. Generally, the Openwave (OW) Email Adapter provisions the Customer Email users into OW Email LDAP server using LDAP protocol. The BSIF workflow may make use of this adapter through Access Proxy Stateless Session Bean. In some embodiments, this adapter is developed using Java Resource Adapter.

DSD Adapter. Generally, the DSD Adapter provisions the Customer Cable Modem into Device Service Directory Server using LDAP protocol. The Device Service Directory may be used by other RR infrastructure components for assigning an IP address to Customer's Cable Modem. The DSD Adapter may also provision the Customer MTA and Digital Phone line information in Device Service Directory. In some embodiments, this adapter is developed using Java Resource Adapter.

PIL Adapter. Generally, the HSD Customer data may also be replicated to a Customer Care Remedy System. The Customer Care Remedy System may use a Provisioning Interface Listener (PIL) to receive data from the BPS 20. The BSIF workflow uses the PIL Adapter through JMS queue. An instance of the PIL Adapter may also be used to send the customer data to DSB for RR Digital Identity. In some embodiments, the PIL adapter is developed using Java Message Driven Bean.

HTTP Adapter. Generally, the HTTP Adapter is used to quarantine or un-quarantine the Customer's Cable Modem. The Customer Cable Modem is forced through RR Residential Portal to register as HoH. The BSIF workflow uses this adapter through JMS queue. The HTTP Adapter may also used to send unsubscribe the caller ID from IM service message to AOL IM servers. The DP workflow uses this adapter through JMS queue. In some embodiments, this adapter is developed using Java Resource Adapter.

WebAPI Web Service. Generally, the WebAPI Web Service is a front end component of the BPS 20. The WebAPI Web Service may be used to manage and query Customer service detail. The WebAPI Web Service may also be used by RR tools and other systems to troubleshoot and manage High Speed Data service email users. Generally, the WebAPI Web Service uses BSIF workflow thru JMS queue. This web service may also be used to receive Residential and Commercial Digital Phone features management transactions from Portal. For Digital Phone features, the WebAPI Web Service may make use of DP workflow through a JMS queue. Generally, this subcomponent receives the PRI and SIP trunk requests from upstream systems. Basic validation of the request may be done here, before the requests are stored in the database. In some embodiments, this web service is developed as WebLogic web application using WebLogic Web Service Framework.

Administrator (Admin) Graphic User Interface (GUI). Generally, the Admin GUI is a web frontend component of the BPS 20. It may be used to configure BPS Adapters and other system configurations. In some embodiments, this is a web application developed using JSP and Pageflow.

PBI Web Service. Generally, the PBI Web Service provides the interface for Billing Systems thru OMSe to submit the DP transactions. The web service transforms the transaction and sends the transaction to DP workflows through JMS queue. In some embodiments, this web service is developed as WebLogic web application using WebLogic Web Service Framework.

Digital Phone (DP) workflows. Generally, the DP workflows orchestrate the business logics for provisioning the DP services. The DP workflows may use a variety of adapters to provision the service network elements. In some embodiments, the DP workflows are developed using Weblogic JPD (Java Process Definition).

Business Trunk workflows. Generally, the Trunk Service workflows orchestrate business logic for provisioning the Commercial Trunk services. The Business Trunk workflows may use a variety of adapters to provision the Trunk Service in network elements. In some embodiments, the Business Trunk workflows are developed using Weblogic JPD (Java Process Definition).

Voice Mail Adapter. Generally, the Voice Mail Adapter provisions the DP service Voicemail into Voice Mail server using HTTP protocol. In some embodiments, the Voice Mail adapter is developed using Java Resource Adapter.

BTS Adapter. Generally, the BTS Adapter is used to provision Customer's Digital Phone Services into a switch, such as a Cisco BTS Switch 10200 using CLI over SSH. In some embodiments, the BTS adapter is developed using Java Resource Adapter.

TAS Adapter. Generally, the TAS adapter creates Subscriber Digital Phone Service in TAS/HiQ using SOAP over HTTP protocol. The DP workflow may make use of this adapter through JMS queue. In some embodiments, the TAS adapter is developed as a Spring Application.

DSB Adapter. Generally, the DSB Adapter processes Subscriber Business Class Phone or Trunk Service update requests from BCP portal over HTTP/JMS. The DSB adapter converts the requests into WebAPI interface format and publishes it through JMS queue. Note that in some embodiments, such as for provisioning SIP and PRI trunk services, an Integrated Access Device (IAD) on the customer premises needs to be provisioned. The BPS 20 may use data in the provisioning request and other internal data structures to construct the configuration data for these IAD devices and then store the constructs in the DSB by sending a message via the DSB adapter. This data may be retrieved by the device provisioners and configured on the device to provision an SIP and Trunk Service. In some embodiments, this adapter is developed as a Spring Application.

HSS Adapter. Generally, the HSS Adapter creates subscriber subscriptions in HSS using SPML (Service Provisioning Markup Language) with SOAP over HTTP protocol. The DP workflow may use this adapter through a JMS queue. In some embodiments, this service is developed as a Spring Application.

DSB Processor. Generally, the DSB (Directory Service Bus) is a common interface to Configuration Manager Server, Firmware Manager Server and Device Discovery System. The DSB Processor may be used to communicate with systems behind DSB. This service will use JMS Bridge to communicate with DSB. The JMS Bridge will publish the JMS message to DSB inbound queue and subscribe to outbound queue for response. The DSB Processor will be the part of WLI control and deployed along with DP workflows.

DP Admin GUI. Generally, the DP Admin GUI is a web frontend component of BPS-DP. The DP Admin GUI may be used to configure BPS-DP Adapters and other system configurations. The Admin GUI may also be used by network planning and capacity planning teams to provision rate centers, as well as Telephone NPA-NXX administration and Softswitch configuration for SIP and PRI Trunk provisioning. In some embodiments, this is a web application developed using JSP and Pageflow.

DP Config GUI. Generally, the DP Config GUI is a web frontend component of BPS-DP. The DP Config GUI may be used for managing the Digital Phone Service Rate Center and CBP information. In some embodiments, the DP Config GUI is a web application developed using JSP and Pageflow.

Having thus introduced aspects of the Broadband Provisioning System (BPS) 20, subcomponents thereof and some of the relationships of the BPS 20 with other components of the Order Manager 10, techniques for providing automated bulk provisioning are now discussed in greater detail.

Figure 3:
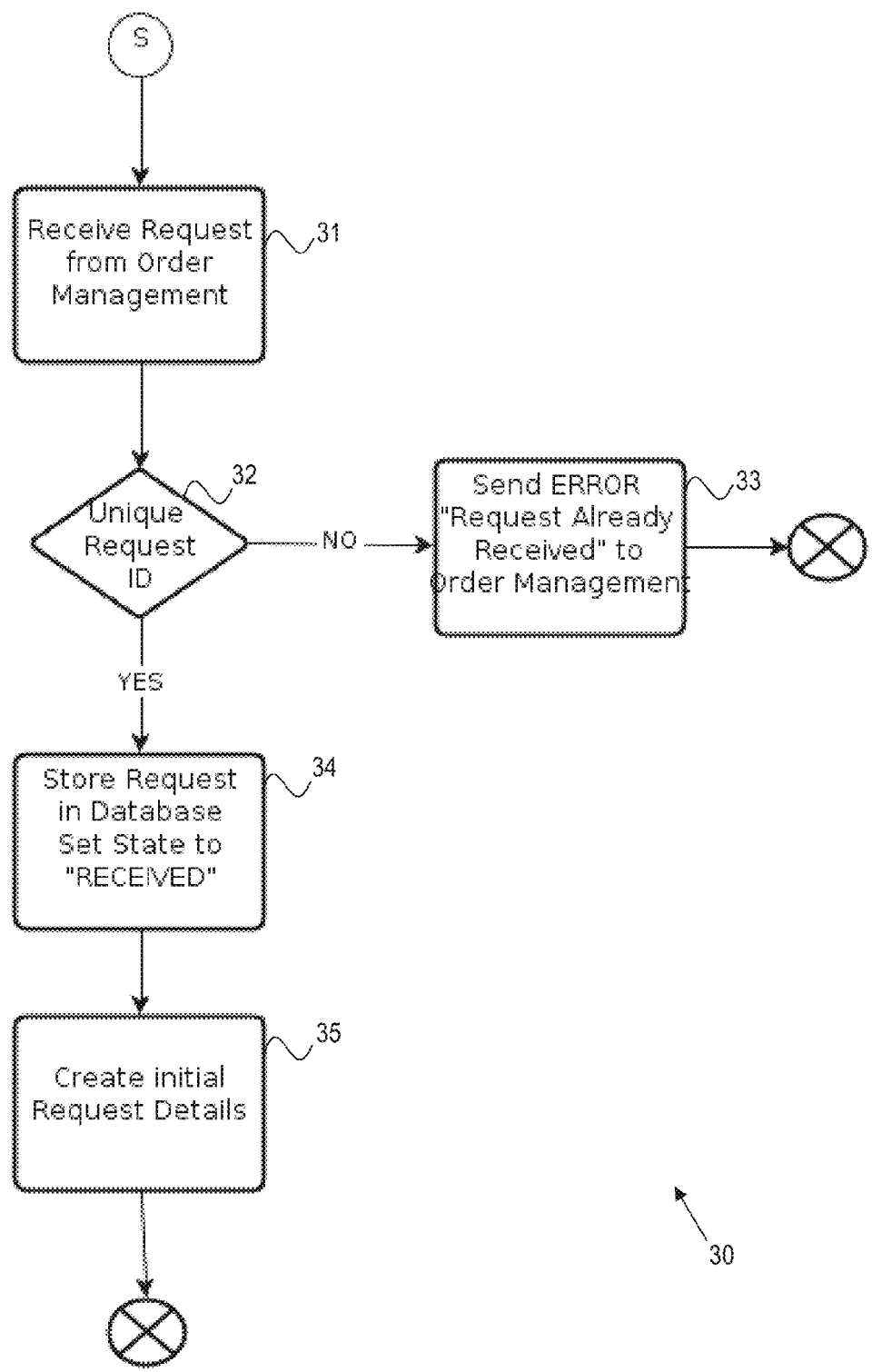
FIG. 3 is a flowchart depicting exemplary actions that are taken upon receipt of an initial request for provisioning within the system of FIG. 1.

Referring now to FIG. 3, there are shown exemplary steps of a method for initiating bulk provisioning 30. In this example, in a first step 31, the BPS 20 receives a provisioning request from the Order Manager 10. In a second step 32, the BPS 20 will determine if the provisioning request has previously been satisfied. If the provisioning request has previously been processed, the BPS 20 will then send an error message in a third step 33 and terminate further processing of the provisioning request. If the provisioning request has not been previously processed, then the provisioning request will be stored in a database and a state for the provisioning request is set to "received" (or a similar condition) in a fourth step 34. Once the state has been set, in a fifth step 35, an initial request is created within the BPS 20. When a request is received as described in FIG. 3, the request may then be stored in the database. Notably, once the OM 10 or the IOM 17 sends in a request, it does not have to block and wait for the response, thus freeing up valuable computing resources which can be used for other purposes.

Figure 4:
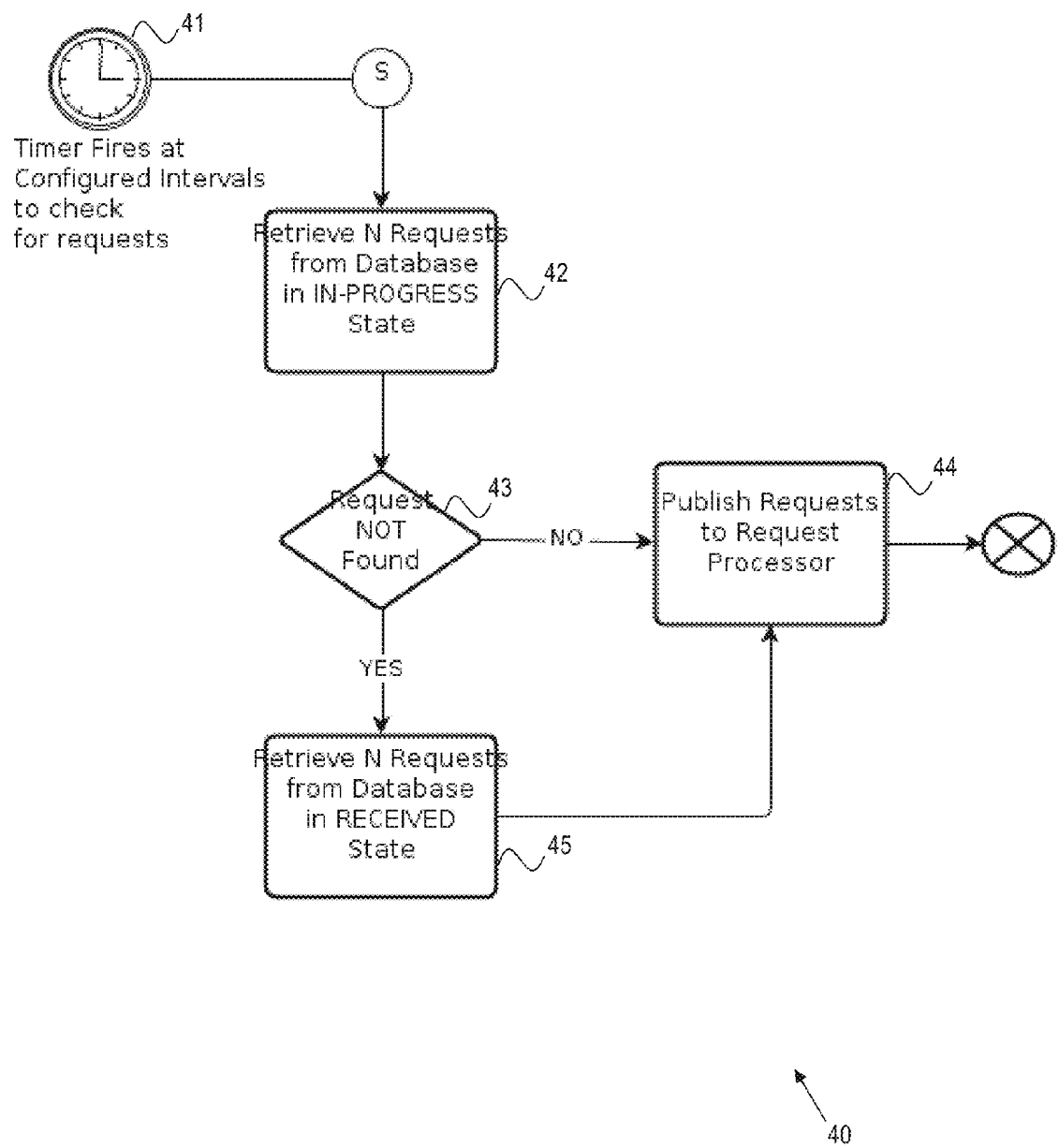
FIG. 4 is a flowchart depicting exemplary actions for checking for requests, as initiated in FIG. 3.

Referring now to FIG. 4, there are shown exemplary steps of a method for checking for a request 40. In a first step 41 of this method, a timer is used to initiate checking for at least one request. In a second step 42, if an outstanding request is identified, then the BPS 20 will retrieve the request from the database. In a third step 43 of this method, a presence of the at least one request is ascertained. In a fourth step 44 of this method, if the at least one request is found, then each request is published to the request processor (see FIG. 5). If the at least one request is not found, then in a fifth step 45, the at least one request that is in a "received" state is published to the request processor (see FIG. 5). In general, the timer may be run at periodic intervals. This will initiate the retrieval of requests stored as shown in FIG. 3. If at least one request is available, the request will then be published to the request processor.

Figure 5:
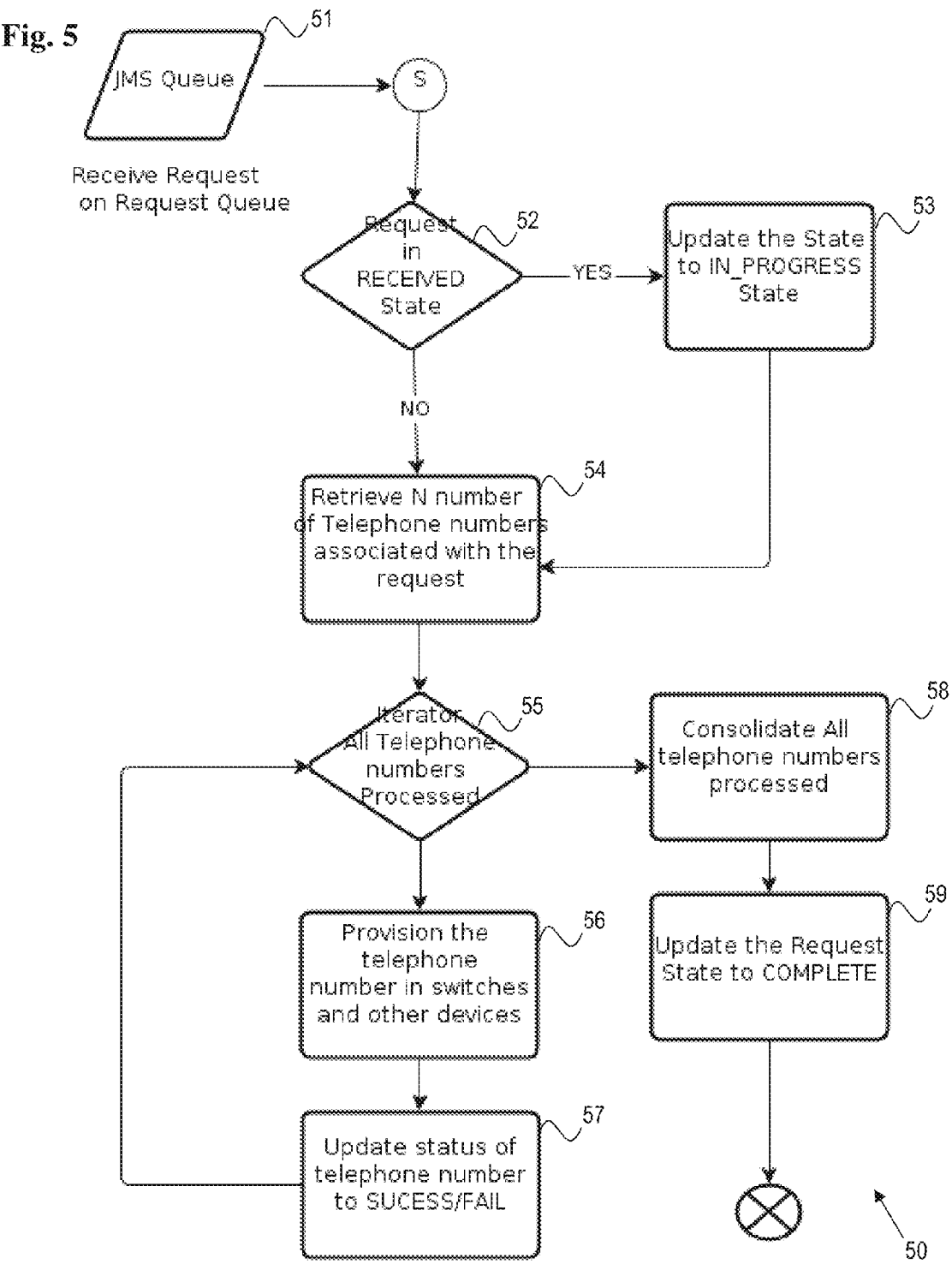
FIG. 5 is a flowchart depicting exemplary actions for processing a given request.

Referring now to FIG. 5, there are shown exemplary steps of a method for processing the initial request 50. In a first step 51 of this method, the initial request is received from the JMS queue. In a second step 52 of this method, the BPS 20 will then test if the provisioning request is set to a "received" state (or a similar condition). In a third step 53 of this method, the BPS 20 will then update the state to "in progress" to reflect commencement of provisioning. In a fourth step 54 of this method, the BPS 20 will then retrieve an appropriate number of telephone numbers (N) associated with the request. In a fifth step 55 of this method, the BPS 20 will initiate iterative processing of the telephone numbers. The processing will include, for example, in a sixth step 56, addressing switches and other devices to enable the telephone number. In a seventh step 57, the processing will include updating the status of each of the respective telephone numbers to reflect success or failure of the enabling performed in the sixth step 56. Once processing has completed, in an eighth step 58, a record of all telephone number processed for the provisioning request is established. Then, in a ninth step 59, the state for each processed telephone number is set to "complete" or a similar condition. For each request published, the individual telephone numbers within that request are processed. Processing is repeated until all telephone numbers in the request are finished processing. Once processing has been completed, the steps in FIG. 6 take place.

Figure 6:
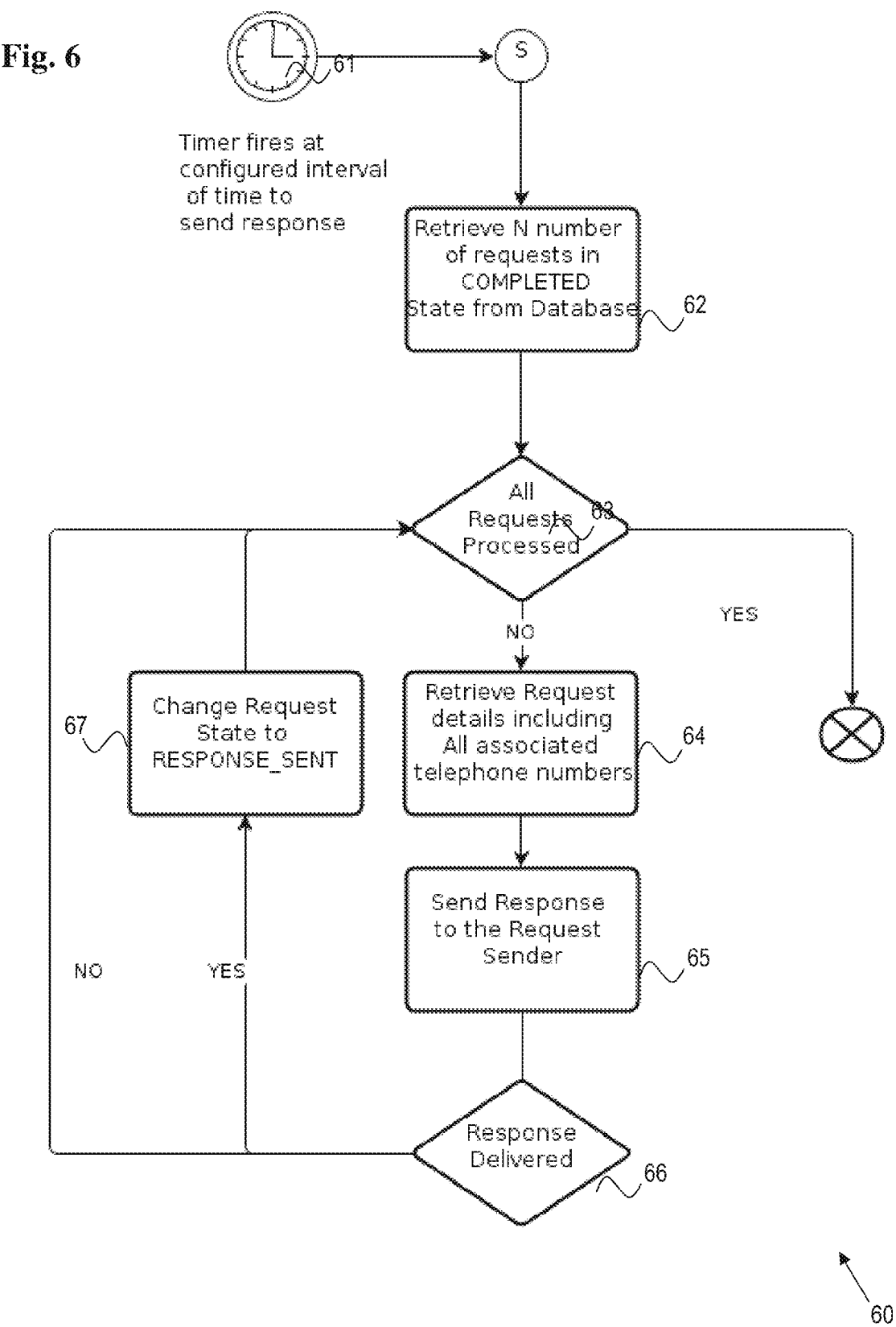
FIG. 6 is a flowchart depicting exemplary actions for monitoring provisioning requests.

Referring now to FIG. 6, there are shown exemplary steps of a method for monitoring for provisioning requests 60. In a first step 61 of this method, a timer initiates the monitoring. In a second step 62 of this method, the BPS 20 will retrieve a predetermined number of requests that have been set to "complete" from the database. In a third step 63, an evaluation is performed to ascertain if all of the retrieved requests have been processed. If the requests have been processed, then no further action is taken. However, in a fourth step 64, if at least one of the requests is complete (and assuming there is still an outstanding request), then appropriate details are collected. For example, all of the outstanding telephone numbers associated with the at least one outstanding request are identified. Subsequently, in a fifth step 65, a response is sent to the request sender, and in a sixth step the response is delivered. If the response is delivered, then in a seventh step 67, the state of the request is changed to "response sent" (or to a similar condition). The method for monitoring for provisioning requests 60 will continue until all requests have been processed (see the third step 63).

Figure 7:
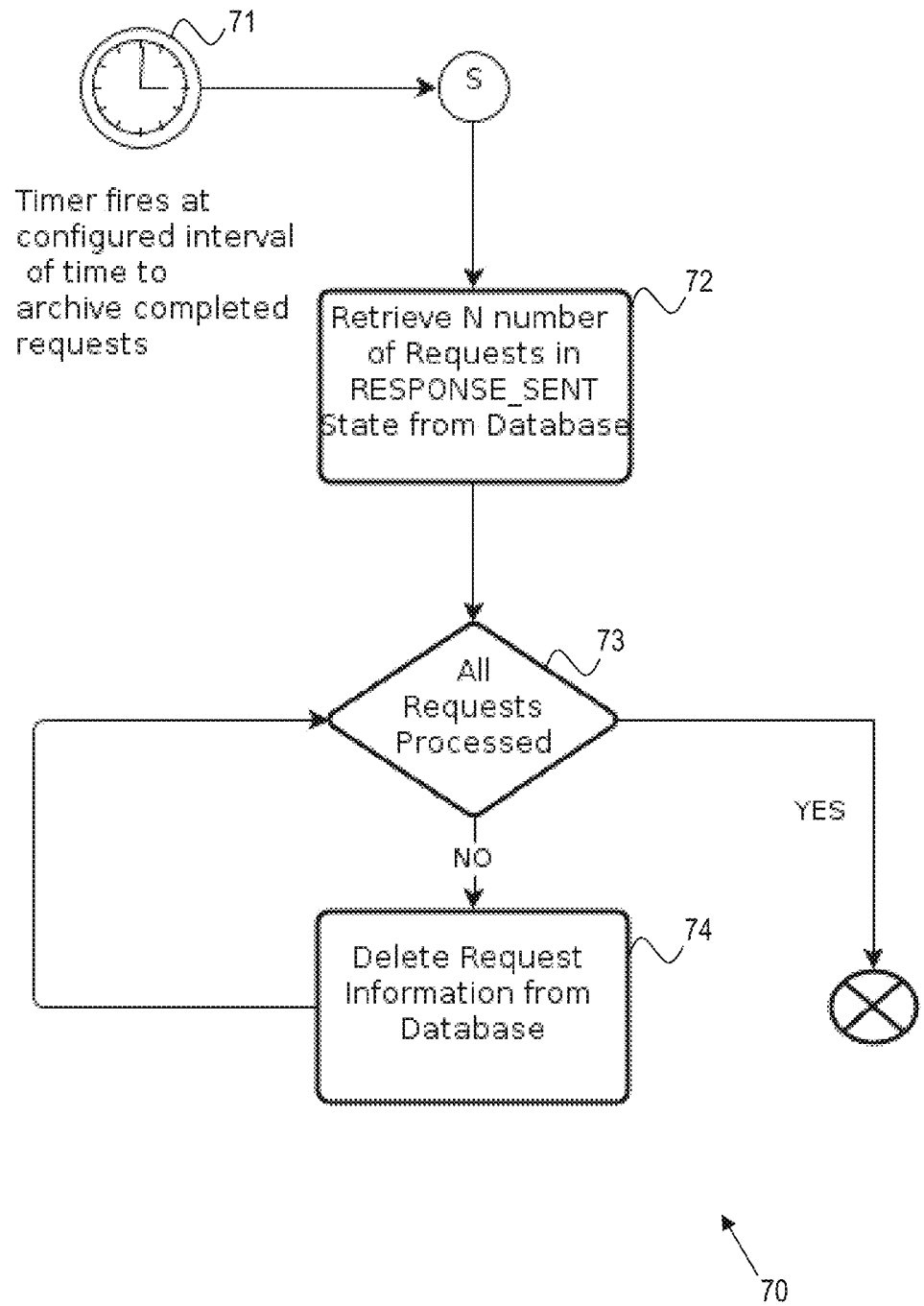
FIG. 7 is a flowchart depicting exemplary actions for archiving processed requests.

Referring now to FIG. 7, there are shown exemplary steps of a method for archival of completed requests 70. In this example, in a first step 71 of this method, a timer initiates evaluation of a need for archival of requests. In a second step 72, the BPS 20 will retrieve a predetermined number of requests that have a state that has been set to "response sent" from the database. In a third step 73, an evaluation is performed to ascertain if all requests have been processed. If all requests have been processed, then the method for archival of completed requests 70 terminates. If all requests have been processed, then, in a fourth step 74 of this method, request information is deleted from the database. The method for archival of completed requests 70 continues until all records have been processed.

In an exemplary embodiment, customer order data is captured by the Billing Manager 12 and a customer relationship manager tool (e.g., Salesforce System) and delivered to the Integrated Order Management (IOM) 17 System. The IOM 17 then constructs a WebAPI asynchronous request with all the telephone numbers in the request and sends the request to BPS 20 with a specific action (create, update, delete etc.). After sending the request, the IOM 17 does not need to wait for response from BPS 20. The BPS 20 validates the incoming request and stores request in a database. A periodic task (e.g., an "AsyncRequestInitiator" task) runs every 'N' minutes, scans for new requests in the database and if available, selects 'M' number of requests (where, M and N are both configurable time frequencies).

In this example, 'M' requests are processed by 'M' business processes (e.g., business trunk workflows) with each business process taking care of a single request. Each of the business processes provisions 'N' number of telephone numbers selected from the request. After provisioning each of these telephone numbers, the response status is stored in the database for the BPS 20. These business processes may be run every 'N' minutes until all of the telephone numbers in the request are provisioned successfully or not. After all telephone numbers in a request are provisioned, the overall response status is stored in the database of the BPS 20.

The periodic task (e.g., AsyncResponseSender) is run every 'N' minutes. The task scans for requests that are processing complete and if available, retrieves the request from the database. The task will also construct a response message, with the status of each telephone number included in the request along with the overall request status. This response message is asynchronously delivered to the request sender by means of a callback HTTP URL specified in the request. The task may also be run every 'N' minutes to scan for requests whose response has been delivered 'M' hours ago. If available, these requests are then moved to an archival data storage.

Having thus introduced techniques for bulk provisioning with the Broadband Provisioning System (BPS) 20, additional aspects are now discussed. For example, it should be noted that the techniques may be implemented by software that is executed by or from an appropriate resource within the Order Manager 10 or IOM 17. Accordingly, the techniques provide for appropriate management of resources such that interference with system operation is minimized.

Further, by maintaining a condition for each telephone number (i.e., an instance of services to be provisioned), the BPS 20 is configured to track failures and to provide for subsequent attempts to provision or troubleshoot each failure. More specifically, and by way of example, a failed attempt to provision services for a telephone number may be tracked and rolled back such that incomplete provisioning does not occur. In some embodiments, the BPS 20 is configured to automatically rollback failed implementations of provisioning of resources.

As discussed herein, "JMS" refers to a JAVA Message-Oriented Middleware application programming interface (API). JAVA is a programming language used to develop application software and web applications. Message-Oriented Middleware is a software infrastructure that enables messages to be sent and received between distributed systems, or multiple operating systems. An API interface enables software programs to interact, or communicate, with other software programs. "JMS Queue" generally refers to a staging or storage area used to retain messages that have been sent and are waiting to be read. Since the queue performs the communication necessary for the receiver to obtain the message, the sender does not require precise knowledge of the receiver's location. Generally, JMS Queue messages are processed only once but are not necessarily delivered in the order sent. Messages in the queue pool may be processed concurrently, resulting in a later message being received by a recipient before an earlier one.

Also as discussed herein, the term "provisioning" generally relates to making resources available to another resource. Specifically, in some embodiments herein, the term "provisioning" generally refers to associating features such as voice mail, long distance, Internet service and the like with a given telephone number, and additionally changing a configuration of the communications system to accommodate the specified features.

As discussed herein, in some embodiments, provisioning occurs at a predetermined interval. However, this is not meant to be limiting. For example, provisioning may occur at different specified times, or may be initiated before or following an event (such as system backup or maintenance). Accordingly, it is considered that a "predetermined interval" may be considered as merely illustrative and not limiting of the teachings herein.

It should be recognized that having resources that are substantially separate from a production system, may call for at least partially separate or independent hardware and software systems. However, this is not required. For example, in some instances, separation from production may be with regard to network traffic, and make use of minimally used or idle production resources. Accordingly, the architectures presented in FIGS. 1 and 2 and the attendant discussion thereof are merely illustrative of some embodiments involving the invention and are not limiting of the teachings herein.

Advantageously, the system disclosed herein provides users with an ability to specify an unlimited number of telephone numbers (discrete or in a range of telephone numbers) in a single provisioning request. Users are also provided with an ability for upstream billing and order management systems to submit a request and then not have to wait synchronously for a response, which frees up processing resources from having to wait potentially for hours for a response from the BPS. The system may be set up to run a periodic task every 'N' minutes (in configurable intervals) and scans for received requests. If requests are received, a predetermined 'M' number of requests (configurable) may be processed every 'N' minutes.

Business processes may be run every 'N' minutes (configurable) to provision 'M' number (configurable) of telephone numbers, as selected from a given request. The business processes may be run every 'N' minutes until all the telephone numbers specified in the request are processed. These business processes may also be configured with transaction and rollback capabilities in case of errors that arise during provisioning. The business processes may also be configured for setting a provisioning response status for a telephone number and the overall request in a data store. A periodic task which may be run every 'N' minutes (configurable) may be set to scan for requests that have completed processing and deliver a response asynchronously to a sender of the request. The response may include provisioning status for each telephone number and the overall request provisioning status. Further, a periodic task may be run every 'N' hours (configurable) to scan for requests whose responses have been delivered 'M' hours ago (configurable) and are eligible to moved to data archives.

Particular advantages of the teachings herein are now provided. First, depending on the number of telephone numbers in the request, the processing time can range from minutes to hours. Accordingly, upstream systems may be configured to query the state of an outstanding request (which can be still be in received or in_progress or complete) state. As part of the response, the message includes the current processing state and the status of each of the telephone numbers specified in the request (Received, in Progress, successful or Failed)

Another advantage is realized with an ability to dynamically configure the number of telephone numbers that can be provisioned in each run of a business process. This capability allows provisioners to throttle requests if they are coming in large numbers or increase the number of telephone numbers that are processed if computing resources are free or reduce the number of telephone numbers if resources are scarce.

An additional advantage is an ability to dynamically configure the number of concurrent requests that can execute in parallel. For example, an administrator can configure the system such that 10 concurrent requests may be processed every 5 minutes, with 100 telephone numbers in each request. This configuration will enable 1000 telephone numbers to be provisioned every 5 minutes. These numbers can be fine tuned to allocate proper resources for SIP and PRI provisioning and also to ensure other provisioning requests have sufficient resources.

Another advantage is realized in that this technique synchronizes request execution across multiple downstream systems (e.g., other communication systems, such as production systems) and maintains the state of execution for each request.

A further advantage is that SIP/PRI trunk services require a device to be installed at the customer premises and they need to be configured with provisioning data before services can be active. Using this system, the BPS constructs the provisioning data for each type (model and vendor) of the device (i.e., constructs device specific provisioning data), sends a message via the DSB adapter to the DSB, which is then stored. Provisioners may retrieve the data via a portal and then provision the device with this data.

Additionally, traditional telephone number provisioning provisions an active service with a dial tone right after the request is processed. This has a disadvantage for PRI or SIP trunk services since 1000's of telephone numbers are being configured and the device has to be provisioned until which the dial tone cannot be made available.

The techniques provided herein introduce a new way to provision inactive telephone numbers. That is, the telephone numbers are provisioned on all downstream systems including the device and can be tested before being installed on the customer premises. However, the telephone number is not visible from outside the network and cannot be used to make or place calls from outside network. Once the device configuration is complete and testing of each telephone number is done, a request is sent to the BPS 20, which will now make each of the telephone numbers visible (i.e., publish each of the successfully provisioned telephone numbers) to the outside world, allowing calls to be routed to and routed from the telephone number.

As discussed herein, "JAVA" is a product that is available from Oracle Corporation of Redwood City, Calif. Java is a general-purpose, concurrent, class-based, object-oriented language that is specifically designed to have as few implementation dependencies as possible. It is intended to let application developers "write once, run anywhere" (WORA), meaning that code that runs on one platform does not need to be recompiled to run on another. "PAGEFLOW" and "SPRING" applications include additional JAVA development tools. It should be recognized that while the embodiments presented herein generally involve JAVA, and tools for implementing JAVA, this is merely illustrative and the teachings herein are not limited to these tools.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. The operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A computing device, comprising: an application tier comprising a plurality of weblogic application servers; a database tier comprising a plurality of database servers; a data store comprising executable software; a processor in data communication with the data store, the processor configured to execute the software and cause the computing device to:
   receive a request to provision a plurality of telephone numbers with communications services in a Primary Rate Interface (PRI) and Signaling Initiation Protocol (SIP) Trunk Service;
   create details for an initial request to provision the plurality of telephone numbers with communications services in the Primary Rate Interface (PRI) and Signaling Initiation Protocol (SIP) Trunk Service and setting an initial state for the initial request to indicate received;
   upon commencement of processing of the request, update the initial state of the request to indicate ongoing processing, provision each telephone number in the initial request by associating resources therewith, and update a status for each telephone number provisioned to indicate in progress; and
   upon completion of processing, change the state of the initial request to indicate completion.

2. The computing device of claim 1, wherein commencement is automatically initiated for initial state requests upon one of: a predetermined chronological time, a predetermined interval of time and an occurrence of an event.

3. The computing device of claim 1, wherein processing of the request is performed for a predetermined number of the telephone numbers.

4. The computing device of claim 1, wherein when a plurality of requests are received, a predetermined number of the requests are selected for processing.

5. The computing device of claim 1, wherein the communications services have been preselected for each one of the telephone numbers.

6. The computing device of claim 1, wherein the processor is further configured to execute the software and cause the computing device to identify at least one of a failed instance of provisioning and a successful instance of provisioning.

7. The system computing device of claim 6, wherein the identifying comprises comparing communications services that have been preselected for one of the telephone numbers with resources that have been associated with the respective telephone number.

8. The computing device of claim 1, wherein at least one of the state, the status and the details are maintained in a database.

9. The computing device of claim 8, wherein data in the database is accessible to a computing system in communication with the provisioning system.

10. The computing device of claim 1, wherein the processor is further configured to execute the software and cause the computing device to dynamically configure a number of telephone numbers for the processing.

11. The computing device of claim 1, wherein the processing is configured to simultaneously process a plurality of requests.

12. The computing device of claim 1, wherein the processing provides for synchronization with downstream systems.

13. The computing device of claim 1, wherein the processor is further configured to execute the software and cause the computing device to construct device specific provisioning data.

14. The computing device of claim 1, wherein the processor is further configured to execute the software and cause the computing device to publish successfully provisioned telephone numbers.

\* \* \* \* \*